United States Patent
Siboni et al.

(10) Patent No.: US 10,810,879 B2
(45) Date of Patent: Oct. 20, 2020

(54) SYSTEM AND METHOD FOR PREVENTING CAR ACCIDENTS AND COLLISIONS BETWEEN VEHICLES AND PEDESTRIANS

(71) Applicant: FORESIGHT AUTOMOTIVE LTD., Nes Ziona (IL)

(72) Inventors: Haim Siboni, Lod (IL); Nir Shemesh, Modi'in (IL); Dror Elbaz, Tel Aviv (IL); Tal Lavi, Modi'in (IL)

(73) Assignee: EYE-NET MOBILE LTD. (IL)

( * ) Notice: Subject to any disclaimer, the term of this patent is extended or adjusted under 35 U.S.C. 154(b) by 0 days.

(21) Appl. No.: 16/496,826

(22) PCT Filed: Apr. 2, 2018

(86) PCT No.: PCT/IL2018/050388
§ 371 (c)(1),
(2) Date: Sep. 23, 2019

(87) PCT Pub. No.: WO2018/185758
PCT Pub. Date: Oct. 11, 2018

(65) Prior Publication Data
US 2020/0035103 A1    Jan. 30, 2020

Related U.S. Application Data

(60) Provisional application No. 62/632,666, filed on Feb. 20, 2018.

(30) Foreign Application Priority Data

Apr. 3, 2017   (IL) .......................................... 251531

(51) Int. Cl.
G08G 1/16      (2006.01)
H04W 4/021     (2018.01)
(Continued)

(52) U.S. Cl.
CPC ........... *G08G 1/166* (2013.01); *H04L 67/104* (2013.01); *H04L 69/16* (2013.01); *H04W 4/021* (2013.01); *H04W 4/025* (2013.01)

(58) Field of Classification Search
CPC ....... G08G 1/166; H04L 67/104; H04L 69/16; H04W 4/025; H04W 4/021
(Continued)

(56) References Cited

U.S. PATENT DOCUMENTS

2005/0073438 A1   4/2005  Rodgers et al.
2011/0093134 A1*  4/2011  Emanuel ............. G05D 1/0297
                                              701/2

(Continued)

FOREIGN PATENT DOCUMENTS

WO       2010004078 A1    1/2010

OTHER PUBLICATIONS

International Search Report and Written Opinion for International application No. PCT/IL2018/050388; dated Jul. 23, 2018.

*Primary Examiner* — Michael Y Mapa
(74) *Attorney, Agent, or Firm* — Mendelsohn Dunleavy, P.C.

(57) ABSTRACT

A system for predicting and preventing car accidents and collisions between vehicles and pedestrians, which comprises a plurality of mobile devices each carried by a pedestrian user or a user riding in a vehicle; a dedicated software application installed on each of the mobile devices adapted to detect the location of the mobile device; one or more geographic servers, each geographic server assigned to a geographic territory and adapted to communicate position and motion information with mobile devices in its geographic territory; and a bridge module adapted to register and sign-in users to the system, and establish and maintain a connection between mobile devices and geographic servers. The geographic server of each territory receives ongoing (Continued)

position and motion updates from all of the mobile devices in its territory and transmits ongoing position and motion updates associated with position and motion of other mobile devices to mobile devices in its territory. The software application is adapted to receive and process updates associated with position and motion of other mobile devices from the geographic server, calculate a collision probability (that may be calculated for a danger domain in the surrounding of the user), and accordingly issue a collision alert to mobile users who are of high probability of collision.

24 Claims, 5 Drawing Sheets

(51) Int. Cl.
*H04L 29/06* (2006.01)
*H04W 4/02* (2018.01)
*H04L 29/08* (2006.01)

(58) Field of Classification Search
USPC ......... 455/404.1–404.2, 412.1, 414.1–414.2, 455/456.1–457, 521
See application file for complete search history.

(56) References Cited

U.S. PATENT DOCUMENTS

| | | |
|---|---|---|
| 2014/0055259 A1 | 2/2014 | Otani et al. |
| 2014/0055614 A1 | 2/2014 | Kahan |
| 2017/0092133 A1* | 3/2017 | Kato .................. G08G 1/166 |
| 2017/0337820 A1* | 11/2017 | Glatfelter ............ G08G 1/164 |
| 2018/0075747 A1* | 3/2018 | Pahwa ............ B60W 30/0956 |

* cited by examiner

SYSTEM AND METHOD FOR PREVENTING CAR ACCIDENTS AND COLLISIONS BETWEEN VEHICLES AND PEDESTRIANS

FIELD OF THE INVENTION

The present invention relates to the field of car accident prevention. More particularly, the invention relates to a mobile device based system and method for a predicting car accidents and providing alerts regarding predicted car accidents.

BACKGROUND OF THE INVENTION

Car accident records reveal that pedestrians are involved in over 30% of fatal car accidents (i.e. car accidents which result in death). Additionally, approximately 75% of the car accidents are caused by a human factor.

Several in-vehicle systems exist, capable of alerting a driver as to the danger of hitting a pedestrian. These systems however fail to provide alerts to the pedestrians regarding car accident danger.

Furthermore, DSRC or V2X, technologies for preventing car accidents by communication between vehicles in which location and velocity information are communicated and algorithms reach conclusions regarding danger possibility and alert such danger. The drawbacks of these technologies are that they rely on expensive dedicated hardware within the vehicles which makes assimilation of such systems difficult. Moreover, this technology fails to provide a solution for pedestrians. Furthermore, presence of dedicated hardware requires a communication frequency standard, which is 5.4 GHz in some cases.

It is therefore an object of the present invention to provide a system and method for predicting and presenting alerts regarding car accidents for vehicles and pedestrians.

It is still another object of the present invention to provide a system and method for predicting and presenting alerts regarding car accidents which utilizes high speed (low latency) communication between pedestrians and vehicles.

It is still another object of the present invention to provide a system and method, with low capital and operational expenses, for predicting and presenting alerts regarding car accidents.

It is still another object of the present invention to provide a system and method for predicting and presenting alerts regarding car accidents which depends on available and established technologies.

It is still another object of the present invention to provide a system and method for predicting and presenting alerts regarding car accidents which can be easily and quickly assimilated.

It is still another object of the present invention to provide a system and method for predicting and presenting alerts regarding car accidents which is user-friendly.

It is yet another object of the present invention to provide a system and method for predicting and presenting alerts regarding car accidents which does not require dedicated hardware.

Other objects and advantages of this invention will become apparent as the description proceeds.

SUMMARY OF THE INVENTION

A system for predicting and preventing car accidents and collisions between vehicles and pedestrians, which comprises:

a. a plurality of mobile devices each carried by a pedestrian user or a user riding in a vehicle;
b. a dedicated software application installed on each of the mobile devices adapted to detect the location of the mobile device;
c. one or more geographic servers, each geographic server assigned to a geographic territory and adapted to communicate position and motion information with mobile devices in its geographic territory; and
d. a bridge module adapted to register and sign-in users to the system, and establish and maintain a connection between mobile devices and geographic servers, where the geographic server of each territory receives ongoing position and motion updates from all of the mobile devices in its territory and transmits ongoing position and motion updates associated with position and motion of other mobile devices to mobile devices in its territory. The software application is adapted to receive and process updates associated with position and motion of other mobile devices from the geographic server, calculate a collision probability (that may be calculated for a danger domain in the surrounding of the user), and accordingly issue a collision alert to mobile users who are of high probability of collision.

Preferably, each territory is divided into sub-territories of a predefined shape (e.g., hexagon), wherein the sub-territories do not overlap each other and no spaces are left between two adjacent sub-territories; and wherein each mobile device receives ongoing position and motion updates associated with position and motion of other mobile devices in its sub-territory.

The system may further comprise a server-side software module, which is adapted to:
  obtain a map of a predetermined area;
  divide the map into geographic territories and mark the territories;
  receive IP addresses of the geographic servers;
  assign a geographic territory to each geographic server;
  generate configuration files; and
  upload configuration files to the geographic server and to the bridge.

In some embodiment of the present invention the server is recognized as scalable double-layered server architecture with a work layer configured to receive location data from users and distribute location data directly to users and a routing layer configured to distribute work between the instances of the work layer. Connection with the user may be implemented by a UDP (User Datagram Protocol), which may be confirmed using a TCP connection. According to an embodiment of the invention, the work layer is recognized by Mobile Edge Computing, which is a network architecture concept that enables cloud computing capabilities and an IT service environment at the edge of cellular networks.

The bridge module may be further adapted to keep a log file comprising records of events in the system.

The software application may be adapted to perform at least one of the following:
  transmit sign in information to the bridge module;
  detect a sub-territory in which a user is located;
  detect the exact position of a user within the sub-territory;
  detect the velocity (speed of movement and direction) of a user;
  detect the acceleration of a user;
  transmit position and motion information to a geographic server;
  detect type of a user; and
  detect and transmit other relevant information.

Transmission from the geographic servers to the mobile devices may be performed over a multicast channel.

Alerts may be sent from a mobile device to one or more other mobile devices using peer to peer connectivity.

Position and motion of a mobile device may be updated four times per second.

In one aspect, a user located in a first sub-territory within a predefined proximity of a second sub-territory receives updates regarding position and motion of other mobile devices in the first and second sub-territory.

In one aspect, a user located in a first territory within a predefined proximity of a second territory transmits position and motion updates to the geographic servers of the first and second territories.

In one aspect, the software application will not provide alerts to the user or to other users and will not send updates to the geographic server and down not process updates if they are received from the server, in at least one of the following cases:

the software application is deactivated;
the software application detects poor GPS reception; or
the software application detects poor cellular reception;

The software application may be adapted to identify transitions of a user from pedestrian to a vehicle and vice versa.

The size of a sub-territory may be adjusted according to the number of users in the sub-territory.

The danger domain may be a sector of a circle, wherein the circle's center is the user's location and the radius of the circle and the length of the sector's arc are determined by the speed and type of the user.

The position and speed of the mobile device may be detected from the GPS receiver of the mobile device.

The position and speed of the mobile device may be calculated according to a previously determined location and updated readings from sensors besides the GPS receiver.

DETAILED DESCRIPTION OF THE INVENTION

A method and system for predicting and presenting alerts regarding car accidents and collisions between vehicles and pedestrians, by using data communication between vehicles and pedestrians, based on a real-time working cellular based geographic platform adapted to receive real-time updates and issue immediate alerts in order to prevent car accidents.

Figure 1:
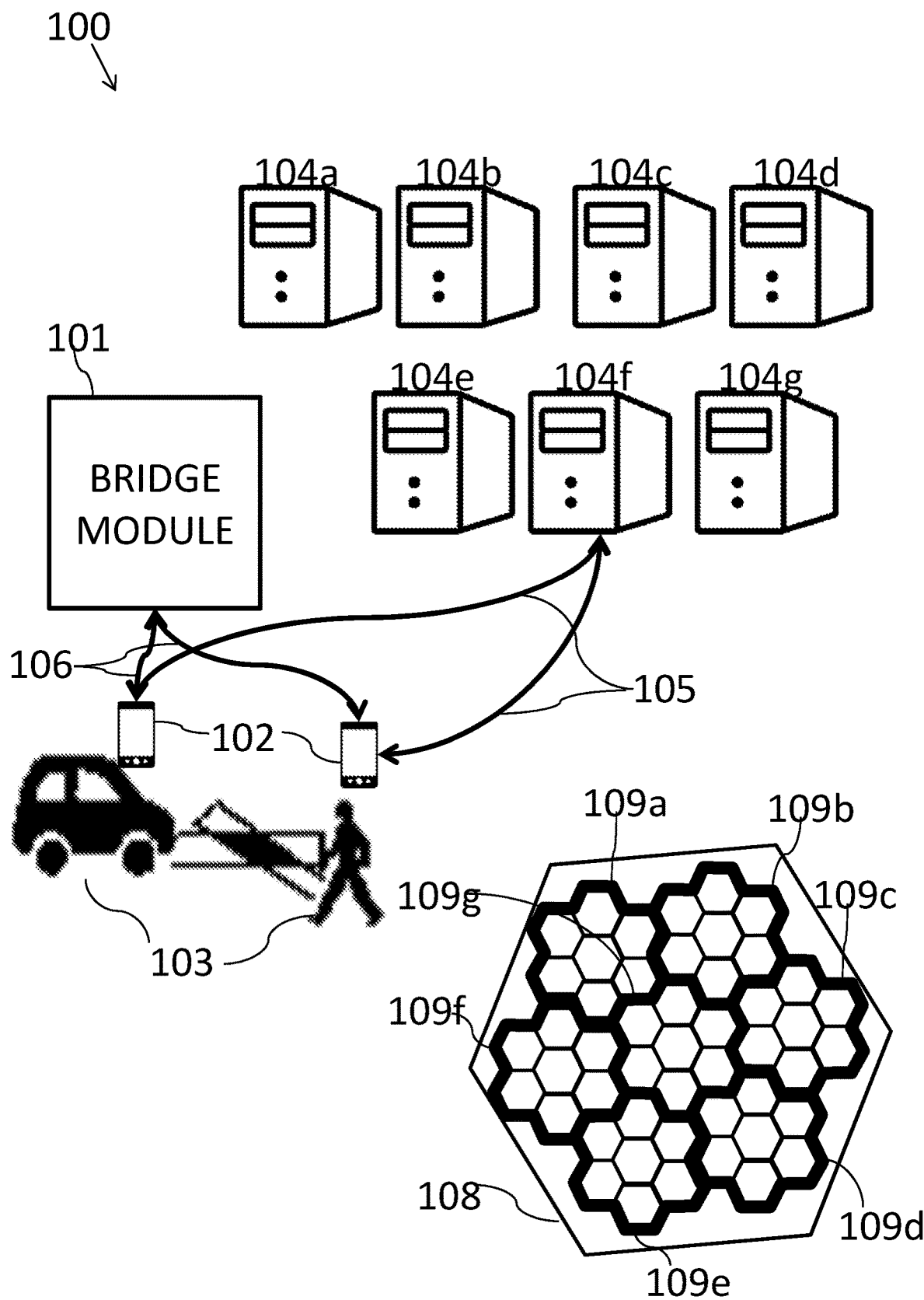
FIG. 1 schematically illustrates a system for preventing car accidents and collisions between vehicles and pedestrians according to an embodiment of the invention.

FIG. 1 schematically illustrates a system 100 for preventing car accidents and collisions between vehicles and pedestrians according to an embodiment of the invention. A bridge module 101 is provided, adapted to receive user names, passwords, email addresses and other relevant registry information (depicted in FIG. 1 as numeral 106) from mobile devices 102 of users 103. Bridge module 106 is further adapted to send software updates to mobile devices, keep a log file comprising records of various events in the system, such as connection and disconnection of users, and establish a connection between a user and a relevant geographic server, as will be explained hereinafter. It is noted that system 100 does not depend on the identity of a user, and therefore is not aware of such information.

Figure 4:
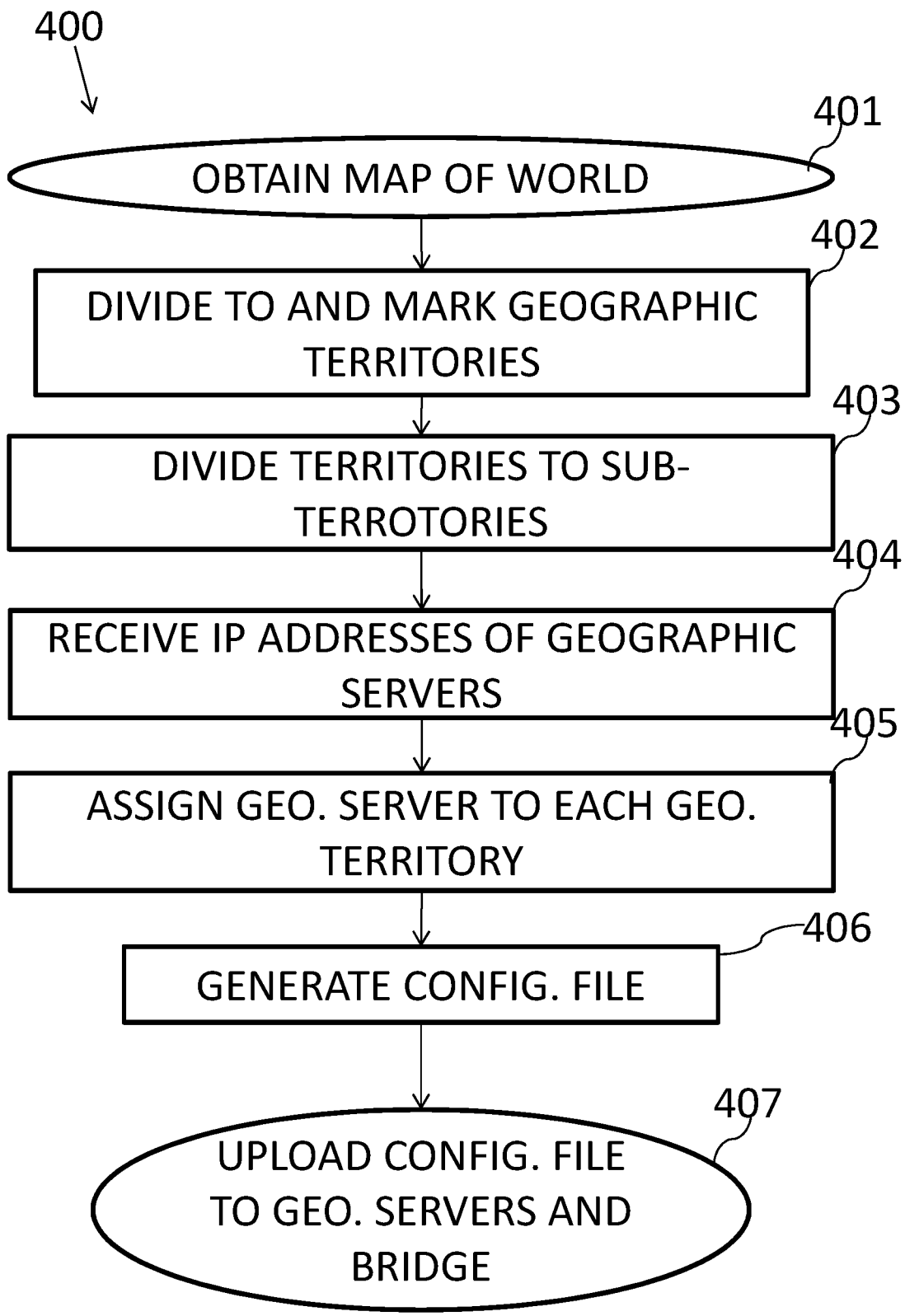
FIG. 4 shows a flowchart of the operation of a server-side software module, according to an embodiment of the invention.

System 100 further comprises a server-side software module (not shown in the figures) which is used on allocation and setup of the system 100. The server side software is run either when first setting up the system 100, or when updating and maintaining the system by changing, for instance, the number of geographic servers. FIG. 4 shows a flowchart 400 of the operation of the server-side software when setting up the system 100, according to an embodiment of the invention. At the first stage 401 a map of the world is obtained. At the next stage 402 the map is divided to geographic territories of the required area (e.g. New York City) in which the system is meant to operate. Each geographic territory is marked. At the next stage 403 each territory is divided to predefine-shaped sub-territories, wherein the sub-territories do not overlap each other, and no spaces are left between two adjacent sub-territories. At the next stage 404, the server-side software receives as input IP addresses of geographic servers. At the next stage 405, each IP of a geographic server is assigned to a geographic territory, and pairs of geographic territory-server are created. At the next stage 406, a configuration file is generated comprising the geographic territory-server pairs and the sub-territories of each geographic territory. At the next and final stage 207, each geographic server receives a configuration file indicating the geographic territory and sub-territories that it is assigned to. Furthermore in stage 207 the configuration file is uploaded to the bridge module 101 in order to route information from users to the correct geographic server, and from geographic servers to the correct users.

Geographic servers 104a-104g are adapted to receive dynamic (i.e. constantly updated) data (depicted in FIG. 1 as numeral 105) from mobile devices 102 of users located in a predefined geographic territory, whereas the territory is divided to predefined sub-territories. The geographic servers 104a-104g are further adapted to transfer ongoing updates of all the elements, i.e. users, located in each sub-territory to each active element located in the sub-territory. The ongoing updates are, according to an embodiment of the invention, transferred through a predefined multicast channel to all elements registered to the multicast group. According to another embodiment of the invention, the ongoing updates are transferred through regular unicast P2P communication.

System 100 further comprises user-side dedicated software application for mobile devices (not shown in the figures). The software application is intended for pedestrian users and for users in a vehicle. The software application is adapted to perform at least the following actions:

sign in to the system, i.e. send username and password to the bridge module;
detect the sub-territory in which the user is located;
detect the user's exact position within the sub-territory;

detect the user's velocity (speed of movement and direction);

detect the user's acceleration;

transmit position and motion information to a geographic server;

detect the user's type, i.e. whether the user is a pedestrian or is riding in a vehicle; and detect and transmit other relevant information.

System 100 utilizes services from a cellular service provider. The services include, but are not limited to:

multicast service for communication between a geographic server and a plurality of mobile devices; and peer to peer (P2P) connectivity between mobile devices for communication of alerts in case high frequency updates are to be transferred by means other than the server, for example in cases of a pedestrian and a vehicle in close proximity, i.e. at high probability of a collision.

According to an embodiment of the invention, the sizes of the sub-territories, is dynamic. The size can depend on the number of users at a given time in a sub-territory, whereas a small amount of users can justify a large sub-territory and a large amount of users justifies a small sub-territory. The size can be changed dynamically and/or automatically according to different times of the day. For instance at rush hour, between 6:00 AM and 8:30 AM the sub-territories are configured to be small, while at other times of the day they resume larger sizes, while maintaining a generally constant number of users in the sub-territory at all times of day. This profitably reduces the average amount of geographic servers operating at a given time, in addition to reducing the load on each server.

Figure 2:
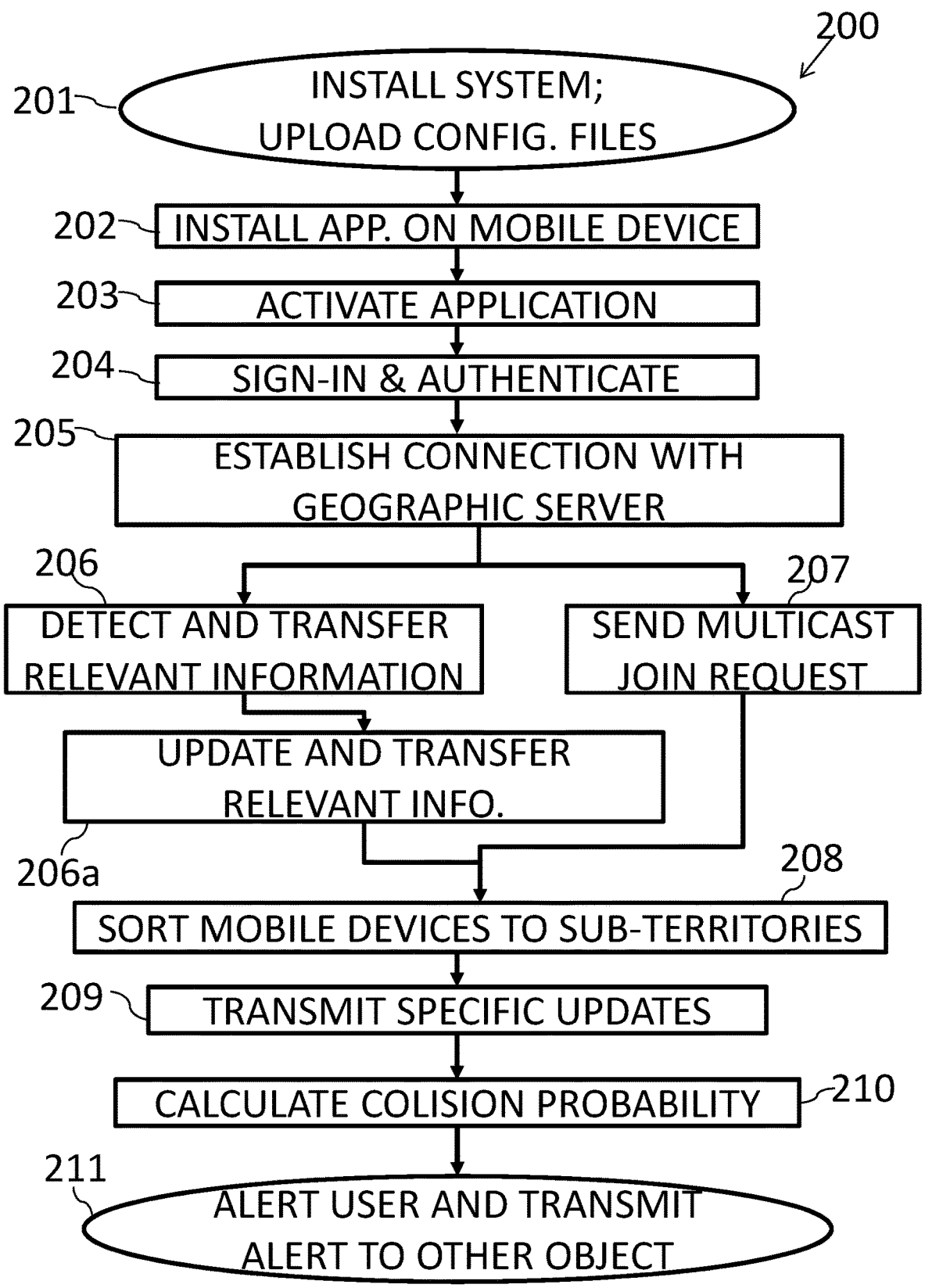
FIG. 2 shows a flowchart describing the process of preventing car accidents and collisions, and providing alerts to vehicular and pedestrian users, according to an embodiment of the invention.

FIG. 2 shows a flowchart 200 describing the process of predicting car accidents and collisions, and providing alerts to vehicular and pedestrian users, according to an embodiment of the invention. At the first stage 201 a system administrator installs the system by uploading configuration files and maps of territories and sub-territories to a bridge module (101 in FIG. 1) and to one or more geographic servers (104*a*-104*g* in FIG. 1) responsible for specific geographic territories. At the next stage 202, a user installs a dedicated software application to a mobile device. The software application can be downloaded from a website or can be available in advance on the mobile device. At the next stage 203 the user activates the software application. At the next stage 204 the user signs in to the system, i.e. the software application sends a user name and password of the user to the bridge module which authenticates the user's sign-in information. After the user's information is authenticated, at the next stage 205 the software application sends position information to the bridge module which establishes a connection between the user's mobile device and the geographic server responsible for the territory in which the user is located. At the next stage 206, the software application detects and transfers at least part of the following information to the geographic server:

the sub-territory in which the user is located;

the user's exact location within the sub-territory;

the user's velocity (speed of movement and direction);

the user's acceleration;

the user's type, i.e. whether the user is a pedestrian or is riding in a vehicle; and other relevant information.

At stage 206*a* the information is updated, i.e. detected and transferred periodically to the geographic server, using unicast communication, i.e. P2P. According to an embodiment of the invention, updates occur four times per second.

Alongside stage 206, at stage 207, the software application on the user's mobile device sends a connection request to the cellular network to join a multicast group in order to receive ongoing updates in downstream from the geographic server regarding all objects (pedestrains and vehicles) present in the same sub-territory as the user at any given time.

After receiving information and updates from every mobile device located within the territory which the geographic server is responsible for, at the next stage 208 the geographic server dynamically relates the mobile devices to sub-territories based on the updated information. At the next stage 209, specific updates, e.g. changes in velocity, acceleration and speed of all mobile devices in the sub-territory are transmitted from the geographic server to each mobile device, using multicast communication, to each mobile device present in a sub-territory. At the next stage 210, after the mobile device receives ongoing sub-territory multicast updates from the geographic server, the software application calculates probabilities of collision with objects located in the user's motion path by overlapping polygons. At the next stage 211, according to the probability of collision with one or more other objects, in case of high probability an alert is provided to the user, and an alert is directly transmitted by P2P to the one or more other objects with which the collision is probable to occur.

According to an embodiment of the present invention, data is shared between the servers and the users using a scalable double-layered server architecture that is optimized for low latency data sharing. The server comprises a work layer and a routing layer.

The work layer consists of a plurality of lightweight instances (e.g., servers) that share the work load, i.e. each server is responsible for performing a portion of the overall tasks. The load on each server is sufficiently small so that each state of a user (such as the user locations as received from the users) may be kept in memory for quick access.

The work layer instances handle a load that can be fit completely in memory and thus requires no database or caching solutions. The work layer is responsible for receiving updates from users and distributing the relevant information directly to other users, as explained herein.

According to an embodiment of the invention data transmitting between the work layer and the users is achieved by a preliminary handshake performed by each user with a server, and thereby setting up an open socket through which updates are transmitted via a low latency protocol, e.g. User Datagram Protocol (UDP), which offers low latency transmission at the cost of unreliability.

Recognizing that UDP protocol suffers several disadvantages, such as unreliability, according to an embodiment of the invention, connection between a user and the server is initiated by the user with a TCP connection to the server. This bi-directional channel is used to determine if UDP packets that are sent from the server indeed arrive at their destination (i.e. the user). The bi-directional exchange of data continues until a mutual agreement is achieved to terminate the active TCP connection and proceed to UDP for further communication. Alternatively the TCP connection may be kept active throughout the whole connection between the user and the server. In order to determine whether to allow UDP-exclusive connection, a packet is sent over UDP and confirmation is performed over TCP. If the packet is received within a predefined criterion the TCP connection may be terminated.

Due to latency being a major consideration in the work layer, the lightweight instances are preferably located geographically near the users, in local instances. In some embodiments of the invention the lightweight instances are recognized by Mobile Edge Computing (MEC), which is a network architecture concept that enables cloud computing capabilities and an IT service environment at the edge of cellular networks. Network congestion is reduced and application performance is higher by running applications and performing related processing tasks closer to the cellular customer.

The routing layer is responsible for distributing work between the resources (i.e. the instances) of the work layer by periodically redirecting clients between work-layer instances. The routing layer comprises an instance (e.g. a server) that monitors the current work load of each work-layer instance. Upon detecting that the load on the work-layer increases (either on a single instance or on a group of instances), the routing layer terminates the operation of a portion of the currently active instances, and redirects work to the remaining instances. By separating and simplifying the low latency part of the system and packaging it as a rudimentary micro-service located close to the users, it is possible to have the advantages of local servers for a part of the system and utilize cloud technologies for another part of the system.

Because latency is less an issue in the routing layer than in the work layer, according to an embodiment of the present invention, the routing-layer instances safely hide behind a load balancing server and are located at a remote location (e.g., in a public cloud). Furthermore, database and caching technologies may be freely used, since in this layer, high availability and simplicity is more important than low latency.

The work layer doesn't require load balancing, and the routing layer is responsible for periodically redirecting traffic to the work-layer instances. Consequently the end users communicate directly with a single work-layer instance. In this sense the scalable double-layered server architecture allows 'pre-load-balancing', in which the load balancing is performed periodically in contrary to it being performed on every request. By switching the roles between the end-user and the server, and causing the server to update the end-users the latency is further decreased. In addition, this allows updates to be collected from multiple work-layer instances without querying each instance separately, and thus, no performance penalty is incurred.

Figure 5:
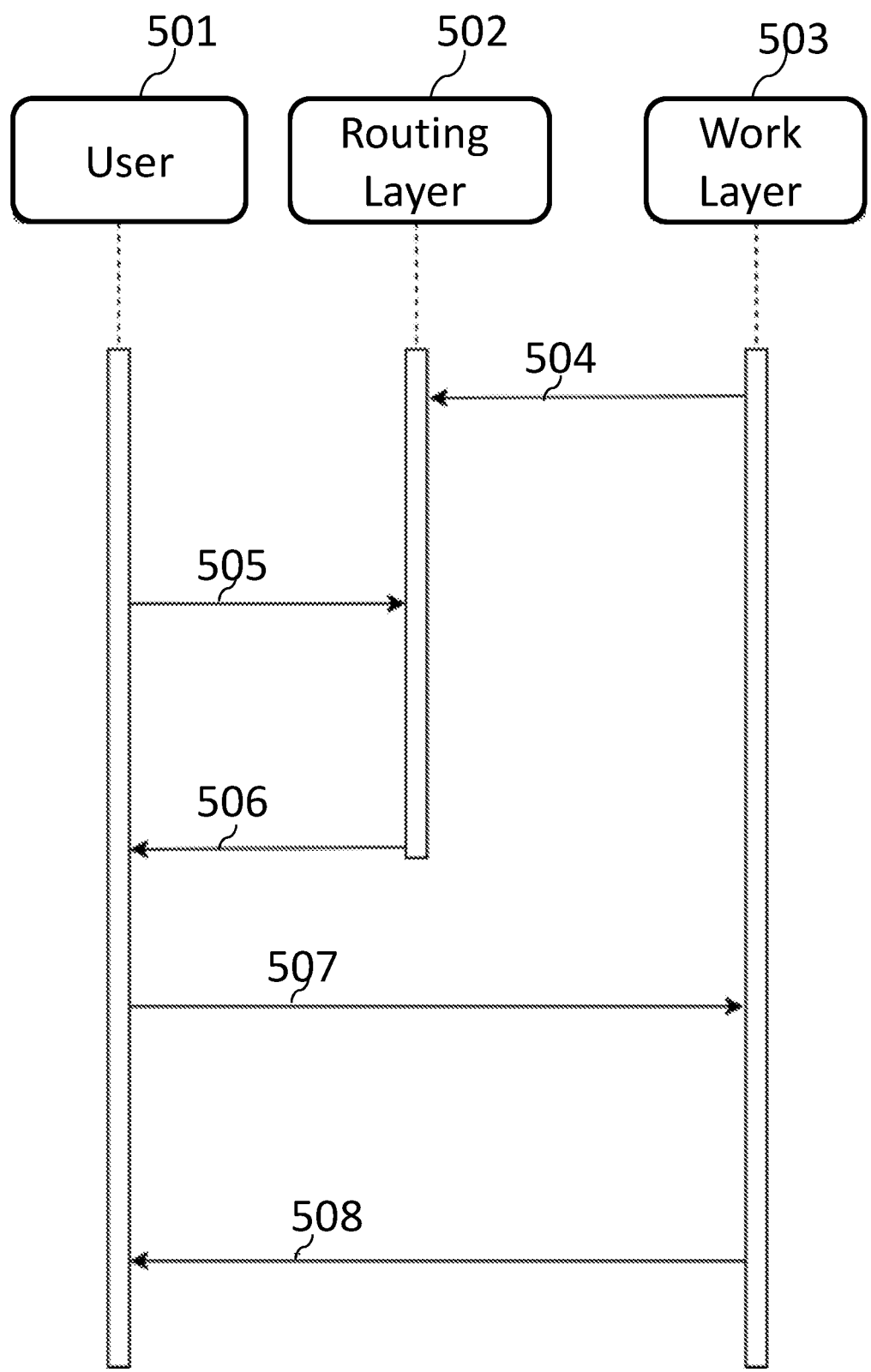
FIG. 5 schematically illustrates a diagram of data flow between an end-user and a scalable-double-layered server architecture, according to an embodiment of the invention.

FIG. 5 schematically illustrates a diagram of the data flow between a representative end-user 501 and the routing and work layers 502 and 503 of the scalable double-layered server architecture according to an embodiment of the invention. A work layer instance 503 periodically sends a 'keep alive' message 504 to routing layer 502 so as to notify the later that the instance exists and is functional and available to serve users. Upon receipt of a route request 505 from user 501 at the routing layer 502, a response 506 is sent to user 501 with the address of work-layer instance 503. The user now communicates 507 with the work-layer instance 503 to notify his existence and posts his latest location. In return, the work-layer instance 503 sends a stream 508 of remote locations that it is aware of.

It is noted that the present invention isn't limited to the aforementioned scalable double-layered server architecture, and may be implemented with any server architecture suitable to share data with users as explained throughout the present disclosure.

As illustrated in FIG. 2, it is emphasized that while the geographic servers are used for receiving and transmitting information regarding location and speed of users in each sub-territory, the vast amount of calculations, i.e. computing the probability of collision according to users in a sub-territory, is performed by the mobile devices of the users and not by the geographic servers. This profitably obviates the need of extensive processing and calculating means in the geographic server. In addition utilizing the mobile devices' processing power allows high speed alerts, which is an essential factor in car accident prevention, thanks to the fact that each mobile device takes in account only users which are within a predefined range, as described herein.

Alerts are issued when the mobile device detects that a vehicular user is probable to enter a danger domain in the surrounding of another user, either pedestrian or vehicular. According to an embodiment of the invention, the danger domain is a sector of a circle wherein the circle's center is the user's location, and the radius of the circle and the length of the sector's arc are determined by the user's speed and type. For example, the danger domain of a pedestrian user walking at 5 MPH can be a sector 15 meters ahead of him, at 20 degrees to each side of the user's front. The danger domain of a vehicular user driving at 20 MPG can be a sector 60 meters ahead of the vehicle, at 10 degrees to each side of the vehicle's front.

According to an embodiment of the invention, when a user (either a pedestrian or a vehicle) in a first sub-territory approaches the border of a second sub-territory (i.e. is in a predefined proximity of another sub-territory), a request is sent from the software application installed on the user's mobile device to join the multicast group of the second sub-territory in order to receive ongoing updates regarding other objects within the second sub-territory. While present in the predefined proximity of a second sub-territory the user receives ongoing updates from the multicast group of the second sub-territory in addition to ongoing updates from the multicast group of the first sub-territory. After exiting the predefined proximity of a sub-territory, a request is sent from the software application to leave the multicast group of the sub-territory which the user left.

According to an embodiment of the invention, when a user (either a pedestrian or a vehicle) in a first territory approaches the border of a second territory (i.e. is in a predefined proximity of another territory), the user is connected to the geographic server responsible for the second territory and will transmit and receive updates therefrom in addition to updates from the geographic server responsible for the first territory.

Furthermore, the user joins the multicast group of the sub-territory in the second territory bordering with the sub-territory in the first territory in which the user is located. After exiting the predefined proximity of a territory, the user is disconnected from the geographic server responsible for the territory which the user left, and a request is sent from the software application to leave the multicast group of the sub-territory which the user left.

In some cases a user can disappear from the system. Disappearance can occur as result of one of the following conditions: i) deactivation of the software application; ii) lack of GPS reception detected by the software application; or iii) lack of cellular reception. According to an embodiment of the invention, when an object (i.e. a user) disappears from the system, the software application will not provide alerts to the user or to other objects and will not send updates to the geographic server or process updates if they are received from the server. When the user reappears, i.e. when the above condition(s) ends, the software application returns to transmit, receive and process updates and to alert accordingly. According to an embodiment of the invention, a user who reappears sends a request to join the multicast group of the sub-territory in which he is located.

According to another embodiment of the invention, when GPS reception is lost the software application obtains readings from sensors of the mobile device other than the GPS receiver (e.g. a gyroscope), and calculates the current position of the mobile device according to updated sensor readings and the last determined location.

Figure 3:
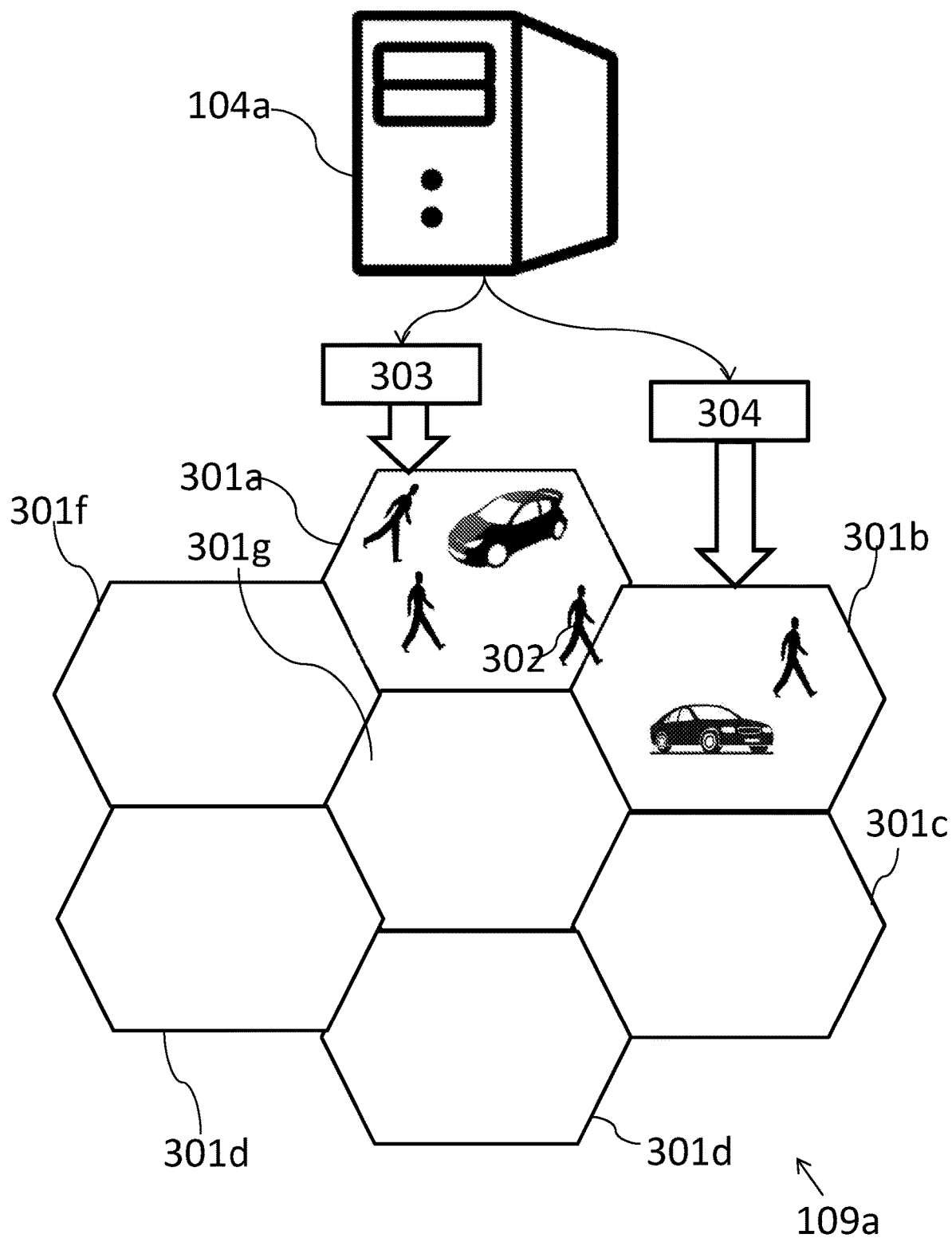
FIG. 3 schematically illustrates a geographic server and its corresponding territory according to an embodiment of the invention.

FIG. 3 schematically illustrates a geographic server 104a and its corresponding territory 109a with its sub-territories 301a-301g according to an embodiment of the invention. All users in FIG. 3 transmit position and motion updates to server 104a which is responsible for territory 109a. Users who are positioned in sub-territory 301a receive from server 104a, via multicast channel 303, ongoing position and motion updates regarding the other users in sub-territory 301a, whilst users who are positioned in sub-territory 301b receive from server 104a, via multicast channel 304, ongoing position and motion updates regarding the other users in sub-territory 301b. User 303 is in sub-territory 301a, although is within a predefined proximity of sub-territory 301b, and therefore receives, via multicast channel 304, position and motion updates regarding users in sub-territory 301b.

The use of geographic servers provides the following advantages and improvements:
- the data downstream from the geographic servers is event driven, i.e. transmission from the geographic servers is performed only if updates arrive, i.e. if the state of a user changes;
- effective transmission based on cellular network multicast infrastructure which allows utilization of a channel typically used for broadcasting;
- the shape of the sub-territories are determined as hexagons, resulting in minimal borders with maximal mapping;

The software application for mobile devices provides the following advantages and improvements:
- distributed calculation of the territory in which each user is located, i.e. each mobile device calculates the territory;
- distributed calculation of collision probability on each user-side mobile device, based on updates of each sub-territory;
- dynamic joining and leaving of update channels (i.e. multicast or unicast, and geographic server) of each territory and sub-territory;
- variable update frequency, according to the user's velocity (e.g. between 0.25 Hz and 4 Hz) and type (i.e. vehicular or pedestrian);
- execution of dead reckoning (i.e. evaluation of the location of a user according to previous location and velocity) to compensate for areas with weak GPS reception; and
- identifying transitions of a user from pedestrian to a vehicle and vice versa.

Although embodiments of the invention have been described by way of illustration, it will be understood that the invention may be carried out with many variations, modifications, and adaptations, without exceeding the scope of the claims

The invention claimed is:

1. A system for predicting and preventing car accidents and collisions between vehicles and pedestrians, comprising:
   a. a plurality of mobile devices each carried by a pedestrian user or a user riding in a vehicle;
   b. a dedicated software application installed on each of the mobile devices adapted to detect the location of the mobile device;
   c. one or more geographic servers, each geographic server assigned to a geographic territory and adapted to communicate position and motion information with mobile devices in its geographic territory; and
   d. a bridge module adapted to register and sign-in users to the system, and establish and maintain a connection between mobile devices and geographic servers;

wherein the geographic server of each territory receives ongoing position and motion updates from all of the mobile devices in its territory and transmits ongoing position and motion updates associated with position and motion of other mobile devices to mobile devices in its territory; and wherein the software application is adapted to receive and process updates associated with position and motion of other mobile devices from the geographic server, calculate a collision probability, and accordingly issue a collision alert to mobile users who are of high probability of collision.

2. A system according to claim 1, wherein each territory is divided into sub-territories of a predefined shape, wherein the sub-territories do not overlap each other and no spaces are left between two adjacent sub-territories; and wherein each mobile device receives ongoing position and motion updates associated with position and motion of other mobile devices in its sub-territory.

3. A system according to claim 1, further comprising a server-side software module adapted to:
   obtain a map of a predetermined area;
   divide the map into geographic territories and mark the territories;
   receive IP addresses of the geographic servers;
   assign a geographic territory to each geographic server;
   generate configuration files; and
   upload configuration files to the geographic server and to the bridge.

4. A system according to claim 1, wherein the bridge module is further adapted to keep a log file comprising records of events in the system.

5. A system according to claim 2, wherein the predefined shape of the sub-territories is a hexagon.

6. A system according to claim 2, wherein the software application is adapted to perform at least one of the following:
   transmit sign in information to the bridge module;
   detect a sub-territory in which a user is located;
   detect the exact position of a user within the sub-territory;
   detect the velocity comprising speed of movement and direction of a user;
   detect the acceleration of a user;
   transmit position and motion information to a geographic server;
   detect type of a user; and
   detect and transmit other relevant information.

7. A system for predicting and preventing car accidents and collisions between vehicles and pedestrians according to claim 1, wherein transmission from the geographic servers to the mobile devices is performed over a multicast channel.

8. A system according to claim 1, wherein alerts are sent from a mobile device to one or more other mobile devices using peer to peer connectivity.

9. A according to claim 1, wherein the position and motion of a mobile device are updated four times per second.

10. A system according to claim 2, wherein a user located in a first sub-territory within a predefined proximity of a second sub-territory receives updates regarding position and motion of other mobile devices in the first and second sub-territory.

11. A system according to claim 1, wherein a user located in a first territory within a predefined proximity of a second territory transmits position and motion updates to the geographic servers of the first and second territories.

12. A system according to claim 1, wherein the software application does not provide alerts to the user or to other users and does not send updates to the geographic server and does not process updates if they are received from the server, in at least one of the following cases:
   the software application is deactivated;
   the software application detects poor GPS reception; or
   the software application detects poor cellular reception; reception.

13. A system according to claim 1, wherein the software application is adapted to identify transitions of a user from pedestrian to a vehicle and vice versa.

14. A system according to claim 2, wherein the size of a sub-territory is adjusted according to the number of users in the sub-territory.

15. A system according to claim 1, wherein collision probability is calculated for a danger domain in the surrounding of the user.

16. A system according to claim 15, wherein the danger domain is a sector of a circle, wherein the circle's center is the user's location and the radius of the circle and the length of the sector's arc are determined by the speed and type of the user.

17. A system according to claim 1, wherein the position and speed of the mobile device is detected from the GPS receiver of the mobile device.

18. A system according to claim 1, wherein the position and speed of the mobile device is calculated according to a previously determined location and updated readings from sensors besides the GPS receiver.

19. A system according to claim 1, wherein the one or more geographic servers are arranged in a scalable double-layered server architecture comprising:
   A. a work layer comprising instances configured to receive location data from users and distribute location data directly to users; and
   B. a routing layer configured to distribute work between resources of the work layer.

20. A system according to claim 19, wherein a user communicates with the one or more geographic servers over a UDP protocol connection.

21. A system according to claim 20, wherein communication over the UDP protocol connection is confirmed using a TCP protocol connection between the user and the servers.

22. A system according to claim 19, wherein the work layer is recognized by mobile Edge Computing (MEC).

23. A system according to claim 19, wherein the routing layer monitors the load on the work-layer instances and upon detecting that the load increases activates new instances and redistributes the work among said new instances.

24. A system according to claim 19, wherein the routing layer monitors the load on the work-layer instances and upon detecting that the load decreases terminates the operation of a portion of the currently active instances and redirects the work to the remaining instances.

* * * * *